United States Patent [19]

Scott

[11] Patent Number: 5,112,630
[45] Date of Patent: May 12, 1992

[54] PIZZA PAGER SIGNALING PROCESS

[76] Inventor: Arthur C. Scott, 427 Elm St., Deerfield, Ill. 60015

[21] Appl. No.: 758,739

[22] Filed: Sep. 12, 1991

[51] Int. Cl.⁵ .................. A23L 1/00; G01N 33/00
[52] U.S. Cl. ........................... 426/233; 99/344; 99/443 C; 219/388; 426/523
[58] Field of Search ............... 426/233, 523; 99/342, 99/344, 443 C; 126/21 A; 219/388

[56] References Cited

U.S. PATENT DOCUMENTS 4,276,465  6/1981  Flavio ........................ 219/388
4,716,820  1/1988  Stuck ......................... 99/443 C Primary Examiner—George Yeung
Attorney, Agent, or Firm—Thomas W. Tolpin

[57] ABSTRACT

A food preparation process is provided in which food service personnel are signaled when cooked pizza or other food is conveyed out of an oven.

20 Claims, 3 Drawing Sheets

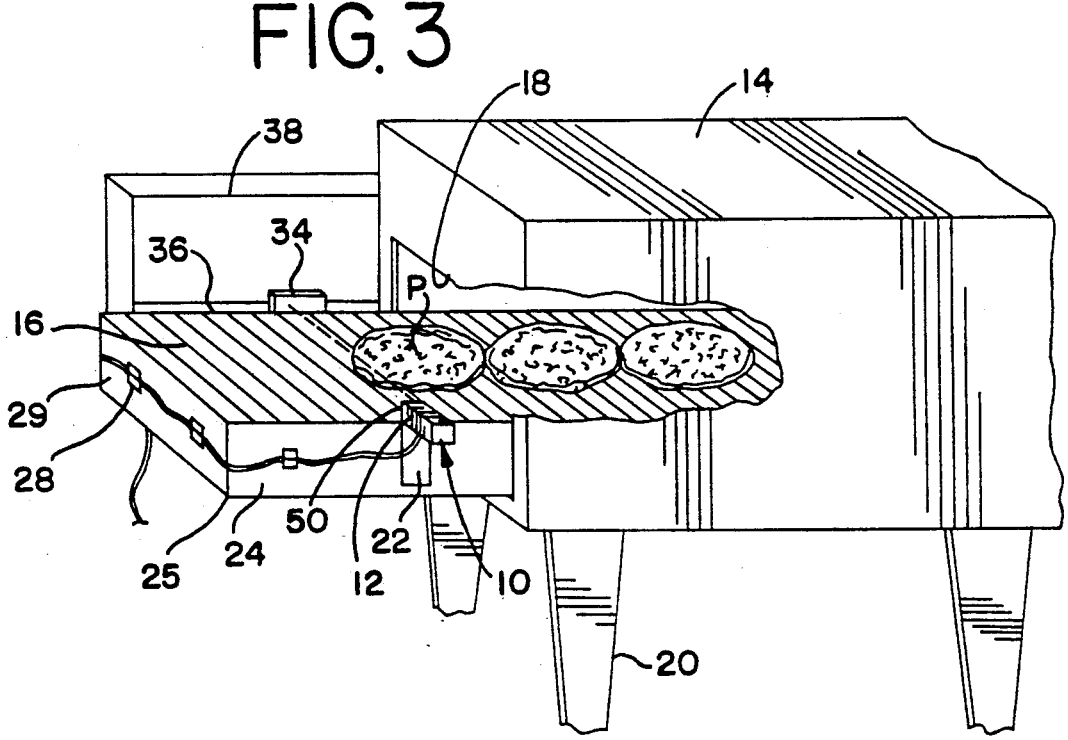
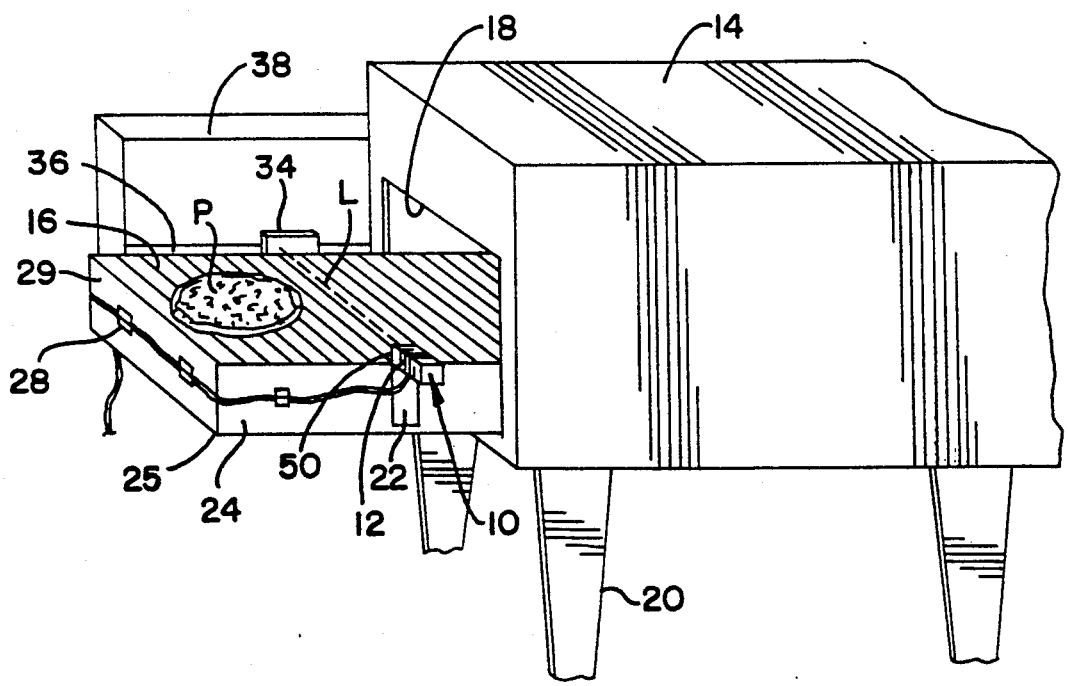

5,112,630

PIZZA PAGER SIGNALING PROCESS

BACKGROUND OF THE INVENTION

This invention pertains to restaurants and, more particularly, to a process for semiautomatic production of pizza.

It is important that pizza be sliced and served while hot or packaged and delivered while hot since customers do not generally want or like cold pizza. While pizza can be reheated, reheated pizza is often soggy and lacks the appeal of freshly cooked hot pizza. It has been estimated by some that pizza loses about 100 degrees Fahrenheit per minute if not kept heated or packaged in thermal insulation.

In an effort to automate, modernize, and increase the production of pizza for quicker delivery to customers, conveyor pizza ovens have been installed in some fast food pizza franchises and pizza parlors in which pizza are automatically conveyed through a continuous pizza oven. While this practice is an improvement, it has caused numerous problems. For example, in the past, hot cooked pizza has been conveyed to stainless steel tables or other metal cutting surfaces for slicing. Unfortunately, steel tables and metal surfaces rapidly cool the pizza. If not quickly removed or if left unattended, cooked pizzas can pile up on the table and backup on the conveyor, which can cause some of the pizzas to collide, buckle, deform or fall off the table and conveyor, resulting in a gooey mess, food wastage, consumer delays, and needless expense. Sometimes the situation becomes so aggravated that pizzas backup all the way on the conveyor into the oven, blocking the oven's exit, so that the cooked pizzas cannot exit the oven and are burned or cinged. These situations can cause enormous frustration, anxiety and stress for pizza personnel and management.

It is, therefore, desirable to provide an improved food preparation process and food paging signaling system which overcomes most, if not all of the preceding problems.

SUMMARY OF THE INVENTION

An improved food preparation process and pizza pager food paging signaling system is provided to help assure that freshly cooked food, such as pizza, can be sliced and packaged or otherwise processed while it is still hot. The novel pager and process for preparing food also help prevent pizza or other food from backing up (piling up) in the conveyor oven and burning as well as minimizes cooked pizza and other food from falling or being dumped off the end of the conveyor and being wasted. Advantageously, the improved method for preparing food and the special food pager help reduce employee stress and anxiety. Desirably, the novel food preparation process and food paging signaling system are convenient, easy to use, efficient, economical and effective.

To this end, the novel food preparation process comprises: moving comestible material comprising uncooked food, such as pizza, through an oven while concurrently heating and cooking the comestible material; discharging and conveying the cooked comestible material from the oven; and signaling food service personnel when the cooked comestible material has been discharged from the oven. The signal can comprise at least one audible tone or a visual signal. The signal can be transmitted to a remote receiver in a separate location in the restaurant or bakery such as in an office remotely away from the oven, to alert management and further enhance quality control. The audible signal is preferably at a comfortable pitch and sufficient decibel (loudness) level to alert food service personnel. The audible signal can comprise a single tone or blast, a series of tones, chimes, or intermittent blasts, or prerecorded words or music. The visual signal can comprise one or more lights of the same or different colors, which can be flashing or continuous. Mechanical signaling devices can also be used.

Before the signal is generated, the presence of the conveying discharged cooked material can be detected by sensing the presence of the discharged cooked material, such as with a microwave sensor, a passive or active infrared sensor, a pressure sensor, a heat (thermal) sensor, or preferably by transmitting or otherwise passing a beam of light across the path of movement of the conveying cooked material such that the conveying cooked material intersects, interrupts and block the beam of light. Such light can be a laser light, visible red light, ultraviolet (UV) light or incandescent light. Other types of light can also be used. Preferably, the light is emitted from a light emitting diode (LED) or a photoelectric transmitting device with a reflector or receptor.

In the preferred form, the food paging signaling system comprises a special pizza pager signaling device which is operable at high temperatures near ovens and under restaurant conditions and a bakery environment where there is often circulating airborne particulates of flour, dough, and other pizza ingredients than can interrupt and interfere with the reliable performance of conventional equipment, typically causing such conventional equipment to malfunction and becomes inoperable.

While the food preparing process and paging system is particularly useful with substantially all types of pizza, they can also be used with other edible food and comestible material, such as with hamburgers, bagels, cake and other bakery goods. The improved process and paging system are also useful for high production, semiautomatic commercial food preparation in pizza parlors, fast food restaurants, bakeries and food processing plants.

A more detailed explanation of the invention is provided in the following description and appended claims taken in conjunction with the accompanying drawings.

BRIEF DESCRIPTION OF THE DRAWINGS

FIG. 3 is a perspective view of the pizza pager signal device with parts broken away for ease of understanding and clarity and illustrating the presence of numerous hot cooked pizzas on the conveyor;

FIG. 4 is a perspective view illustrating the hot cooked pizza after it has been conveyed past the pizza pager signaling device.

DETAILED DESCRIPTION OF THE PREFERRED EMBODIMENT

Figure 1:
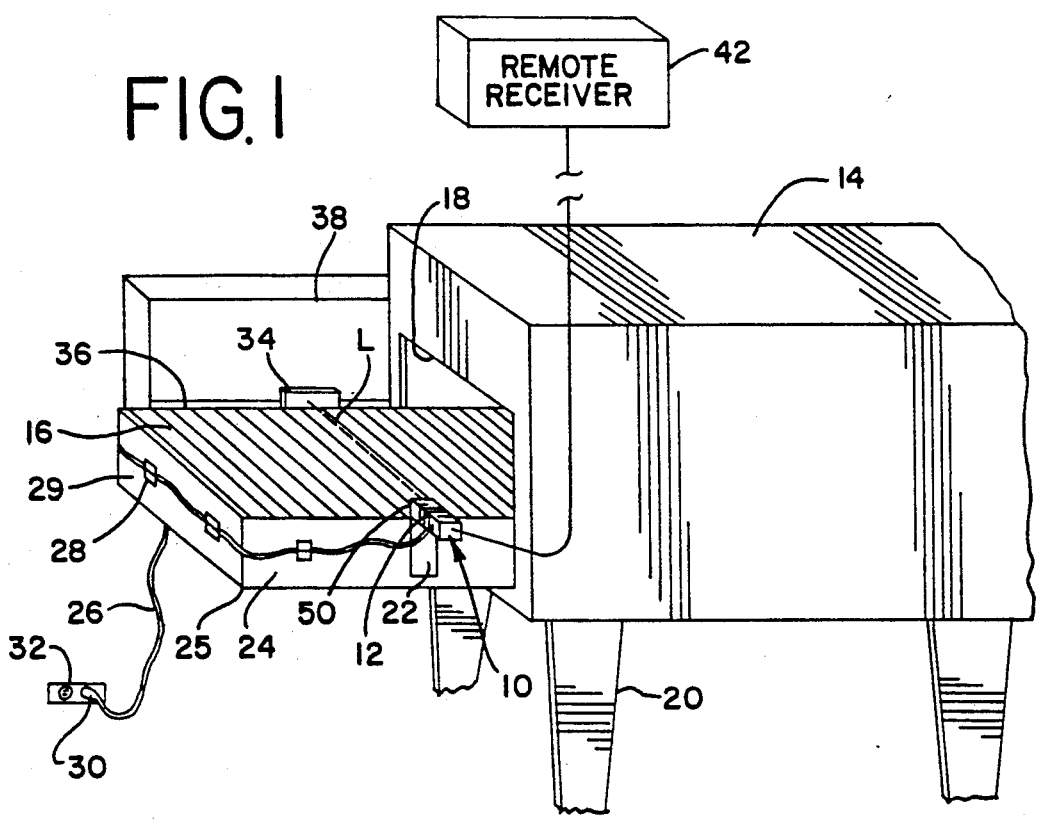
FIG. 1 is a perspective view of a pizza oven and conveyor with a pizza pager signaling device and remote receiver.

A pizza pager and food paging signaling system 10 comprises an automatic pizza pager signal device, unit and assembly 12 to automatically detect and signal when hot coked pizza P is conveyed out of open ended conveyor pizza oven 14. More specifically, the pizza pager signaling device 12 which is sometimes referred to as a pizza paging or food paging signaling device, automatically senses and signals the presence of hot cooked pizza on a conveyor 16, such as a horizontal endless chain link, wire mesh, or belt conveyor, after the pizza has been cooked, exited, and conveyed out of the outlet or exit 18 of the oven. While the food paging signaling system and process are particularly useful for detecting, paging, and alerting personnel of the presence of freshly baked hot pizza, the food paging signaling system and process can also be used to identify, sense, signal and page personnel of the presence of other types of food.

In the preferred embodiment, the conveyor 16 extends horizontally through the inlet (entrance) and exit 1 of the open ended pizza oven 14, which can be elevated and supported by legs 20 or other support means. The signaling device 12 is mounted on a bracket 22 along the front side rail, wall and frame member 24 of the conveyor frame assembly 25 at a position and height downstream and in proximity to the exit 18 of the oven and above the discharge conveyor 16. The signaling device has an electric cord 26 which can be fastened by cord clips 28 to the front 24 and downstream (left) end wall and rail 29 of the conveyor frame assembly. The electric cord 26 has a outlet plug 30 for insertion and connection to an electric outlet 32. Positioned and aligned across the conveyor 16 from the pizza pager signaling device 12 is a reflector or receptor 34. The reflector 34 is mounted against, along and above the back rail, wall and frame member 36 of the conveyor frame assembly 25 at a position and height downstream and in proximity is the exit 18 of the oven 14 and above the discharge conveyor 16. The reflector 34 is positioned and arranged to receive a beam of light L emitted from the pizza pager signaling device 12. The beam of light L is located just above the top surface of the conveyor 16. The reflector 34 can also be mounted against the conveyor-facing wall 38 of a motor housing 40, which can cover and house the drive motor of the conveyor 16. A remote control receiver and secondary pizza pager signaling device 42 (FIG. 1) can be positioned in an office or in some other location in the restaurant or pizza parlor remotely away from the oven 14. The remote control receiver and secondary pizza pager signaling device can be hard-wired through an electric line to the primary pizza pager signaling device 12. A wireless remote control receiver and secondary pizza pager signaling device 42 can also be used.

The pizza pager signaling device 12 has a photoelectric sensing assembly and unit 50 to photoelectrically sense and optically detect the presence of hot cooked pizza on the conveyor 16 after the pizza has been conveyed out of the oven 14. The photoelectric sensing assembly 50 emits, detects and receives photoelectric beams of light by transmission, direct reflection, or retro-reflection. The photoelectric sensing assembly 50 can comprise a retro sensor with a photoelectric cell, switch or relay and a built in power supply and light source comprising an infrared light emitting diode (LED). The response time can range from 2 to 25 msec at temperatures ranging from about −10 degrees C. to about +55 degrees C. One useful type of photoelectric sensing assembly is available from Opcom Company in the 14100 series model. Other photoelectric sensing assemblies can be used.

Figure 5:
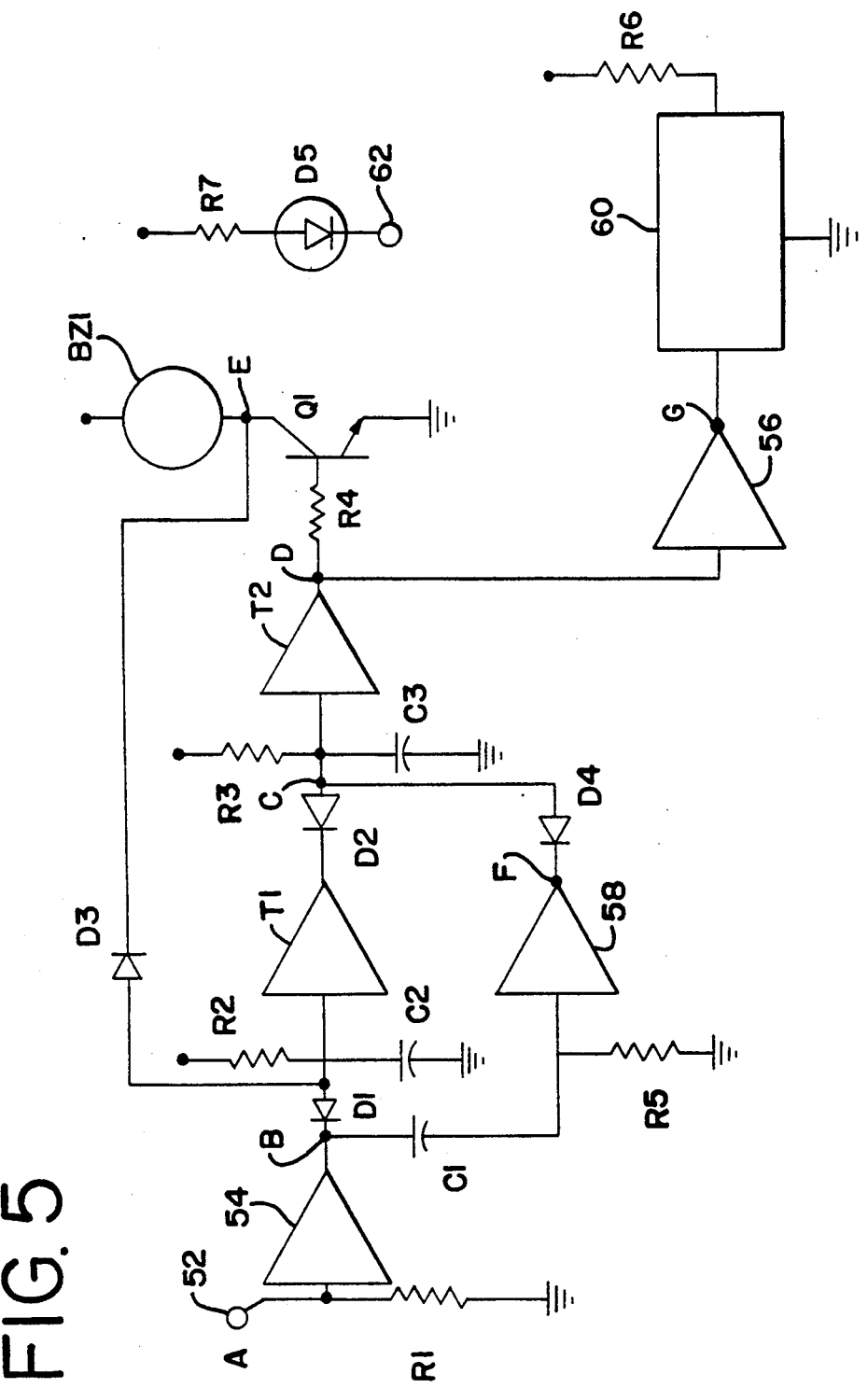
FIG. 5 is a schematic diagram of the electric circuitry of the pizza pager signaling device.

The preferred electric circuitry of the pizza pager signaling device 12 is shown in FIG. 5. The photoelectric sensing unit 50 includes a white sensor 52 at point A which is connected to a resistor R1 and a first driver 54 comprising a first buffer and voltage inverter. The first driver 54 at point B is connected to a first reverse direction diode D1 and a capacitor C1. The front end of the first diode D1 is connected to a resistor R2, a capacitor C2, and a first timer or clock comprising solid state time delay components. The first timer T1 is connected to a second reverse direction diode D2. The front end of the second diode D2 is at point C connected to a third resistor R3, a third capacitor C3, and a second timer T2. The second timer T2 at point D is connected to a fourth resistor R4 and a second driver 56 comprising a second buffer and voltage inverter. Resistor R4 is connected to a transistor Q1, triac or solid state switching device, which in turn at point E is connected to an audible alarm buzzer BZ1. A third diode D3 is connected to the front end of the first diode D1 and is connected at point E to buzzer BZ1 and transistor Q1. The capacitor C1 is connected to a resistor R5 and to a one shot monostable multivibrator timer 58, which at point F is connected to a fourth reverse direction diode D4. The front end of the fourth diode D4 is connected at point C to the front end of the second diode D2. The second driver 56 is at point G connected to a transmitter 60 of the remote secondary signaling device which in turn is connected to a resistor R6. The sensing unit can also include a green sensor 62 comprising a diode D5 connected to a resistor R7.

Preferably, the pizza pager signaling device 12 and bracket 22 (FIGS. 1-4) is mounted on the oven conveyor front rail 24 (across from the conveyor motor housing 40) at the oven outlet 18. A beam of light, such as a visible red beam of light, can be projected across the conveyor 16 by the pizza pager signaling device 12 to a reflector 34 mounted on the opposite back rail flange 36 in front of the conveyor motor housing 40. When the pizza pager signaling device 12 is plugged into a 115 v electrical outlet, it will sense a freshly cooked hot pizza, traveling on the conveyor 16, breaking the beam of light and activate, generate, and produce a momentary distinct clear audible tone signal. The pizza pager signaling device 12 can continue to sound once every minute while the beam of light remains broken and blocked by the hot cooked pizza. The tone will resound as soon as a restored beam of light is broken and blocked again by another freshly cooked hot pizza. This installation provides for regular removal and cleaning of conveyor side rails.

A preferred method of installing the pizza pager signaling system 10, is as follows:

1. Position and mark the location of, but do not yet secure, the pizza pager signaling device 12 and bracket 22 on the front rail 24 of the conveyor frame assembly 25 near the oven outlet 18, at least three inches from hot main body of the oven 14. Preferably, the lip of the bracket 22 should sit atop of the front rail 24.

2. Set pizza pager signaling device 12 and bracket 22 aside and clean contact area of the front rail 24 with a towelette to remove any grease or other debris on the surface to which the bracket 22 is to be mounted.

3. Peel paper backing from the back surface of the bracket 22 and firmly secure the bracket 22 to the front rail 24. Mounting screws or other fasteners can also be used. The pizza pager signaling device 12 can be connected to the bracket 22 via a threaded stem and nut or by other fastening means.

4. Plug the adaptor plug 30 of the electric cord 26, extending from the pizza pager signaling device 12, into a 115 v electrical outlet. The electric cord 26 can have a socket plug to engage and plug into a pin receptacle in the bottom of the pizza pager signaling device 12. The adapter plug can be an AC adapter, such as Archer AC adapter, having an input of 120 v AC, 60 Hz, 14 w, and an output of 12 v DC, 500 mA, cat. no. 273-1652, manufactured by Radio Shack, a division of Tandy Corporation. Turn on the power switch of the pizza pager signaling device 12 to activate the pizza pager signaling device 12. The power on-off switch can extend outwardly and externally from the outer end (non-conveyor facing end) of the pizza pager signaling device 12. Use cord clips 28, with the self-adhesive backing, to secure loose electric cord 26 to the front and end rails 24 and 29. Clean surfaces of the front and end rails 24 and 29 with one or more towelettes before affixing the adhesive back surfaces of the cord clips 28. Coil any excess electrical cord 26. Do not use cord clips 28 on the main body of the oven 14.

5. Clean the surface of the back rail flange 36 (directly across the conveyor 16 from the pizza pager signaling device 12 and bracket 22) with a towelette.

6. Position and mark the location of the reflector 34, horizontally on the back rail flange 36 so the indicator light is illuminated on the pizza pager signaling device 12. Do not yet secure the reflector 34 to the back rail flange 36. Center the red beam of light in the middle of the reflector 34 by moving the reflector 34 slightly left or right as required. If the beam of light is too high or too low, firmly hold the pizza pager signaling device 12 against the front rail 24, and carefully press the pizza pager signaling device 12 and bracket 22 up or down as required until the indicator light is illuminated and centered on the reflector 34.

7. Peel the lower half of the adhesive paper backing from the back surface of the reflector 34 and firmly mount reflector 34 on the back rail flange 36.

8. Plug in the remote control receiver and secondary pizza pager signaling device 42 at the desired location. A wireless door bell can be used as the remote control receiver and secondary 42, such as FCC ID: GXKMP60000 RX/TX.

For maximum reliability, accuracy, maintenance, and care, the reflector 34 and lens of the pizza pager signaling device 12 should be wiped regularly, as needed, to prevent buildup and caking of airborne pizza dough and ingredients and other material circulating in the air. If the pizza pager signaling device 12 sounds each minute, even when no cooked pizza is present on the conveyor 16, it is an indication that the lens or reflector needs cleaning or the pizza pager signaling device 12 and bracket 22 has been moved out of position. The indicator light should remain illuminated when no cooked pizza is in the path of the beam of light generated from the pizza pager signaling device 12. The pizza pager signaling device 12 should be turned off and preferably unplugged at the close of each business day.

Pizza can be prepared for cooking and baking by: kneading dough; rolling the dough into a generally flat dough base having a substantially flat or planar bottom surface; and spreading or sprinkling pieces or slices of cheese on the dough base to from a layer of cheese on the dough base. The pizza is preferably cut into a circular or rectangular shape. One or more ingredients as requested by the customer can be placed on the layer of cheese, such as: tomato, tomato sauce, olives, mushrooms, sausage, pepperoni, hamburger, ham, bacon, anchovies, onions, and spinach. The pizza P can be placed on a pan either before or after it is fully prepared.

The uncooked pizza is placed on the inlet portion of the oven conveyor 16 prior to cooking by: engaging the bottom surface of the uncooked pizza or pan with a shovel, spatula, or other instrument; lifting, carrying, and moving the uncooked pizza with the shovel, spatula, or other implement; depositing and positioning the uncooked pizza on the conveyor 16 upstream of and in proximity to the inlet or entrance of the open ended pizza oven 14; and removing the shovel, spatula or other implement away from the uncooked pizza before the uncooked pizza is substantially moved through the open ended pizza oven.

After the uncooked pizza is placed on the oven conveyor 16, the pizza is conveyed and moved linearly and horizontally through the open ended pizza oven 14 for a sufficient period of time and temperature to cook the pizza. The cooked pizza is conveyed out of and discharged from the exit 18 of the pizza oven along a path of movement. Significantly, when the cooked pizza has been discharged from the open ended pizza oven 16, a signal is emitted and generated by the pizza pager signaling device 16 and remote secondary signaling device 42 to alert pizza personnel to slice and package the cooked pizza before the cooked pizza cools to an undesirable cool temperature.

Figure 2:
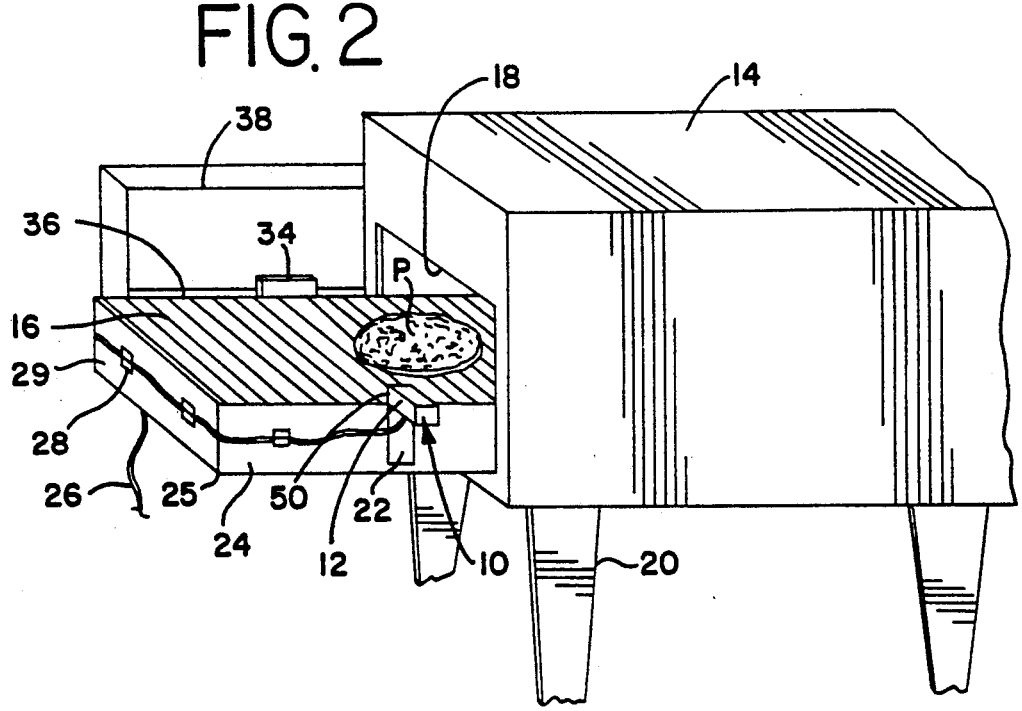
FIG. 2 is a perspective view of the pizza pager signal device indicating the presence of a hot cooked pizza discharged from the pizza oven on the conveyor.

Such signaling preferably comprises optically detecting the presence of the cooked pizza along the path of movement on the conveyor 16 in proximity to an exit 18 of the pizza oven 16 by: emitting a beam of light L with the pizza pager signaling device 12 transversely across the conveying path of movement of the cooked pizza as shown in FIG. 1; intersecting, interrupting and blocking the beam of light with the cooked pizza is conveyed through the beam of light along the path of movement as shown in FIG. 2 or 3; and acoustically generating an alarm comprising at least one audible tone from the pizza pager signaling device 12 when the beam of light is blocked by the discharged cooked pizza. To keep management and other personnel informed who are not close to the exit 18 of the pizza oven 16, at least two audible alarms are acoustically generated simultaneously at different locations, via the primary pizza pager signaling device 12 and the remote secondary pizza pager signaling device 42, when the beam of light is intercepted and blocked by the discharged cooked pizza.

When the pizza is upstream of the signaling device 12 and beam of light, i.e. between the oven 14 and the signaling device 12 (condition 1) as shown in FIG. 1, so that the pizza does not intercept, interrupt and block the beam of light, sensor output 52 ( FIG. 5) point A is positive and the input of the first drive 54 is positive. First driver 54 output B is negative and the output is positive. Diode D2 is blocked allowing capacitor C3 to charge positive through resistor R3 making the input of the second time T2 positive and point D negative. With point D negative, transistor Q1 and second driver 56 are turned off. Points E and G are positive keeping the transmitter 60 and buzzer BZ1 off.

When the pizza intercepts, interrupts, and blocks the beam of light emitted from the signaling device 12 (condition 2) as shown in FIG. 2, so that the sensor is dark and the cooked pizza is in front of the sensor, sensor 52 (FIG. 5) output point A is negative. The input of the first driver 54 is negative. The first driver 54 output B is positive. Diode D1 is blocked allowing capacitor C2 to charge positive via resistor R2, and allowing the timer T1 to time out. Also, a positive signal is coupled through capacitor C1 into the one shot timer 58 and the one shot output point F momentarily swings negative. The time delay is determined by the value of capacitor C1 and resistor R5. The negative signal from point F passes through diode D4. Capacitor C3 is discharged making the input of the second timer T2 now negative and its output D positive. The timers on-time is determined by the value of resistor R3 and capacitor C3. With output D positive, the transistor Q1 and the second driver 56 are turned on and actuated so that points E and G become negative, turning on (activating) buzzer BZ1 and the transmitter 60. Also, through diode D3, the first timer T1 input swings negative turning off (deactivating) timer T1. The second timer T2 now times out. Capacitor C3 is charged positive via resistor R3. The output swings negative turning off (deactivating) transistor Q1 and the second driver 56. Points E and G become positive. D diode D3 is now blocked allowing the first timer T1 input to charge positive, via capacitor C2 and resistor R2.

After the pizza has passed the pizza pager signaling device 12 (FIG. 4), the pizza pager signaling device is reset and the beam of light is restored to hit (contact) the reflector 34 (condition 3), the sensor 52 (FIG. 5) output A is positive. The input of the first driver 54 is positive. The output B of the first driver 54 is negative. Through diode D1 the input of the first timer T1 is negative. Capacitor C2 is discharged and the first timer timer T1 is not allowed to time out. The circuit is sitting idle.

When numerous cooked pizza are continuously conveyed past the pizza pager signaling device 12 as shown in FIG. 3, so that the sensor is dark and the beam of light is intercepted, interrupted, and blocked by the cooked pizza (condition 4), the first timer T1 (FIG. 5) continues to time out. After a preset time delay, the first timer T1 output swings negative, discharging capacitor C3. The second timer T2 output swings positive again turning on, activating and energizing transistor Q1 and the second driver 56. Points E and G swing negative. Buzzer BZ1 and transmitter 60 are turned on and activated. The negative signal from point E also switches the first timer T1 off through diode D3 discharging capacitor C2, making the output of the first timer T1 positive, and allowing the second timer T2 input to charge via resistor R3. The second timer T2 now times out. Pint D swings negative, turning off and deactivating transistor Q1 and the second driver 2. Points E and G swing positive. With point E now positive, diode D3 is blocked. The first timer T1 is now allowed to time out via resistor R2 and capacitor C3 on the input. As long as the sensor is dark, i.e. the beam of light is blocked by a cooked pizza, the cycle continues every preset interval to activate the buzzer BZ1 and the transmitter 60. To stop the cycle, the pizza have to pass the signaling device 12 so that the sensor light is restored as per condition 3.

Among the many advantages of the novel pizza pager signal device and and process are:
1. Outstanding Performance.
2. Superb detection and signaling of hot cooked pizza and other food.
3. Greater assurance that hot cooked pizza can be sliced and packaged or otherwise process while still hot.
4. Prevents burning of pizza in the pizza oven.
5. Minimizes cooked pizza and other food from falling off the end of the conveyor.
6. Prevents pizza from piling up and clumping together.
7. Helps improve the health and disposition of employees by helping reduce employee stress and anxiety.
8. Avoids packing soggy and lukewarm pizza.
9. Decreases food wastage.
10. Increases customer satisfaction.
11. Greater savings of baking materials.
12. Economical.
13. Convenient.
14. Easy to use.
15. Safe.
16. Efficient.
17. Effective.

Although embodiments of the invention have been shown and described, it is to be understood that various modifications and substitutions, as well as rearrangements of parts, elements, components, and process steps, can be made by those skilled in the art without departing from the novel spirit and scope of this invention.

What is claimed is:

1. A food preparation process, comprising the steps of:
   moving comestible material through an oven; while concurrently
   heating and cooking said comestible material in said oven;
   discharging said cooked comestible material from said oven;
   conveying said comestible material from said oven; and
   signaling when said cooked comestible material has been discharged from said oven.

2. A food preparation process in accordance with claim 1 wherein said signal comprises at least one audible tone.

3. A food preparation process in accordance with claim 1 wherein said signal comprises a visual signal.

4. A food preparation process in accordance with claim 1 wherein said signal is transmitted to a remote receiver spaced remotely away from said oven.

5. A food preparation process in accordance with claim 1 wherein said comestible material is moved through and discharged from said oven by a conveyor.

6. A food preparation process in accordance with claim 1 wherein said comestible material comprises edible food selected from the group consisting of hamburgers, bagels, cake, pizza, and bakery goods.

7. A food preparation process in accordance with claim 1 wherein said signaling includes detecting the presence of said conveying discharged cooked comestible material.

8. A food preparation process in accordance with claim 7 wherein said detecting comprises transmitting a beam of light across the path of movement of said cooked comestible material and said conveying cooked comestible material intersects and blocks said beam prior to emitting a signal.

9. A food preparation process in accordance with claim 8 wherein said light is selected from the group consisting of a laser beam, visible red light, ultraviolet light, and incandescent light.

10. A food preparation process in accordance with claim 8 wherein said light is emitted from a light emitting diode.

11. A food preparation process in accordance with claim 8 wherein said light is emitted from a photoelectric transmitting device.

12. A food preparation process in accordance with claim 7 wherein said detecting comprises sensing the presence of said cooked comestible material with a sensor selected from the group consisting of a microwave motion sensor, a passive infrared sensor, an active infrared sensor, an ultraviolet sensor, a heat sensor, and a pressure sensor.

13. A food preparation process, comprising the steps of:
   placing uncooked pizza on an oven conveyor;
   heating and cooking said pizza by moving said pizza linearly through an open ended pizza oven on said oven conveyor for a sufficient period of time and temperature to cook said pizza;
   discharging and conveying said cooked pizza from said oven along a path of movement; and
   signaling when said cooked pizza has been discharged from said open ended pizza oven to alert pizza personnel to package said cooked pizza before said cooked pizza cools to an undesirable cool temperature, said signaling comprising optically detecting the presence of said cooked pizza along said path of movement in proximity to an exit of said pizza oven by
   emitting a beam of light transversely across said path of movement of said cooked pizza in proximity to said exit of said pizza oven;
   intersecting and blocking said beam of light with said cooked pizza when said cooked pizza is conveyed through said beam of light along said path of movement; and
   acoustically generating an alarm comprising at least one audible tone when said beam of light is blocked by said discharged cooked pizza.

14. A food preparation process in accordance with claim 13 wherein said audible tone is generated by a remote receiver spaced remotely away from said oven.

15. A food preparation process in accordance with claim 13 wherein said light is transmitted to a reflector or receptor.

16. A food preparation process in accordance with claim 13 wherein said light is selected from the group consisting of a laser beam, visible red light, an ultraviolet light, and incandescent light.

17. A food preparation process in accordance with claim 13 wherein said light is emitted from a light emitting diode.

18. A food preparation process in accordance with claim 13 wherein said light is emitted from a photoelectric transmitting device.

19. A food preparation process in accordance with claim 13 including:
   preparing said uncooked pizza by kneading dough;
   rolling said dough into a dough base having a substantially planar bottom surface;
   spreading a layer of cheese on said dough base;
   placing at least one ingredient on said cheese selected from the group consisting of tomato, tomato sauce, olives, mushrooms, sausage, pepperoni, hamburger, ham, bacon, anchovies, onions, and spinach; and wherein
   said uncooked pizza is placed on said conveyor by engaging said bottom surface of said uncooked pizza with an implement selected from the group consisting of a shovel and a spatula;
   lifting, carrying, and moving said uncooked pizza with said implement;
   depositing and positioning said uncooked pizza on said conveyor upstream of and in proximity to an inlet of said open ended pizza oven; and
   removing said implement away from said uncooked pizza before said uncooked pizza is substantially moved through said open ended pizza oven.

20. A food preparation process in accordance with claim 19 wherein:
   said pizza is conveyed substantially horizontally;
   said light is reflected across said path of movement of said cooked pizza; and
   at least two audible alarms are acoustically generated substantially simultaneously at different locations when said beam of light is blocked by said discharged cooked pizza.

* * * * *